July 10, 1962    T. T. GRAHAM    3,043,342
COLD PATCH WITH INSERTABLE ADHESIVE MEANS FOR REPAIRING PIPES
Filed Dec. 21, 1959

Thomas T. Graham
INVENTOR.

BY Charles E. Lightfoot
ATTORNEY 3,043,342
COLD PATCH WITH INSERTABLE ADHESIVE
MEANS FOR REPAIRING PIPES
Thomas T. Graham, 3211 Maroneal St., Houston, Tex.
Filed Dec. 21, 1959, Ser. No. 861,102
2 Claims. (Cl. 138—99)

This invention relates to the repairing of leaks in pipes and more particularly to the patching of small holes in pipes or conduits while the same are filled with fluid under pressure.

In the operation of pipe lines such as oil and gas lines, leakage often occurs due to small openings, pin holes, or the like, caused by electrolysis, pitting or other defects, which are difficult to repair while the line is in service. Attempts are frequently made to repair such leaks by welding, but this method is usually not successful because of the pressure of the escaping fluid which continuously blows the molten metal outwardly as it is deposited. Moreover, the welding of pipes under pressure is attended by a considerable risk of fire. It has also been proposed to apply patches over such defects and to weld the same in place while the pipe is under pressure. The welding of patches is, however, subject to the same disadvantages that the escaping fluid prevents the formation of a complete seal, and there is danger of cutting through the wall of the pipe during the welding operation.

The alternative to effecting a repair of the leak while the pipe is under pressure is to shut off the line while the repair is being made, or to take the line out of service while a section of the pipe is being replaced. The occurrence of such leaks thus often results in the carrying out of expensive replacement operations.

The present invention has for an important object the provision of a patch for pipes by which the above difficulties may be overcome and which may be applied to pipes while the same are under pressure without welding or heating.

Another object of the invention is to provide a patch for pipes, or the like, which may be applied while the same are under pressure, and which is applied over and adhesively secured in surrounding relation to the opening or defect in the pipe.

A further object of the invention is the provision of a patch for application to pipes under pressure and having seal forming means which is adapted to be clamped against the external surface of the pipe in surrounding relation to the opening to be closed to seal off the opening to permit the application of a settable, adhesive material to the patch and pipe about the exterior of the seal forming means.

Another object of the invention is to provide a patch of the kind referred to having radially spaced, annular seal forming elements positioned for sealing engagement with the external surface of a pipe in surrounding relation to an opening therein to seal off the leak to permit the introduction between the elements of a settable, adhesive material between the elements to secure the patch to the pipe.

A further object of the invention is the provision of a cold patch for pipes having means for forming a sealed off annular space surrounding an opening in a pipe, whose interior is under pressure, to prevent the escape of fluid from the pipe into said space, to permit the space to be filled with a settable, adhesive material to secure the patch to the pipe.

Another object of the invention is to provide a cold patch of the type mentioned which is easily applied and which is capable of use for the permanent repair of leaks in pipes under pressure.

The above and other objects and advantages of the invention may best be understood from the following detailed description constituting a specification of the same when considered in conjunction with the annexed drawings, wherein—

Figure 1:
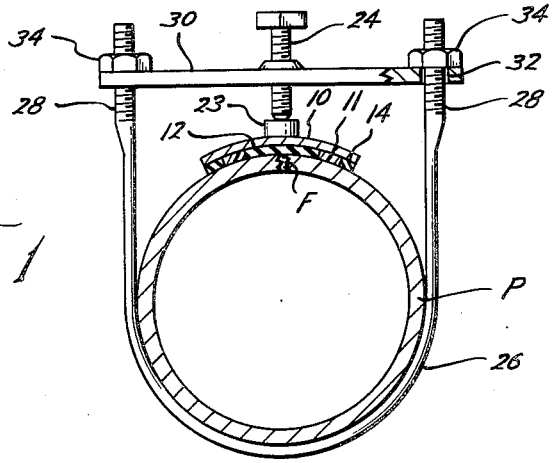
FIGURE 1 is a lateral cross-sectional view, illustrating a preferred embodiment of the invention showing the patch clamped in place on a pipe and the manner in which the patch is applied in repairing a leak.
Figure 2:
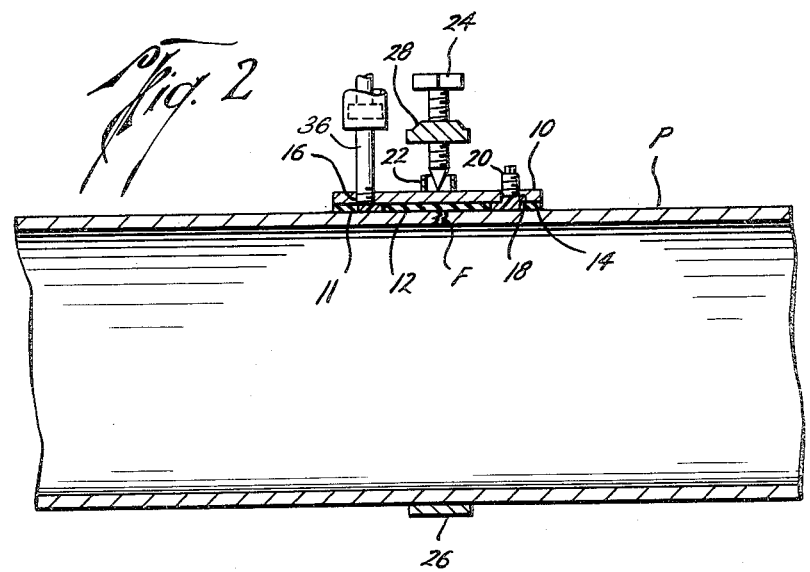
FIGURE 2 is a longitudinal, cross-sectional view of the invention as illustrated in FIGURE 1, showing the manner in which the settable, adhesive material is applied to secure the patch to the pipe.
Figure 3:
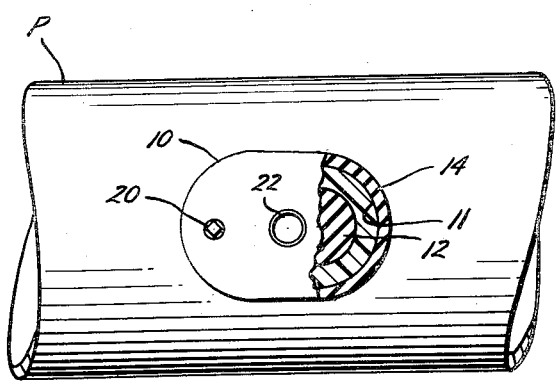
FIGURE 3 is a top plan view, partly broken away and partly in cross-section, showing the patch in place after the completion of the repair and with the clamp removed.

Referring now to the drawings in greater detail, the invention is disclosed herein in connection with its application to the repair of pipes, such as those employed in pipe lines for the transportation of gas, oil and the like, but it will be understood that the invention may be employed with equal facility in the repair of other types of equipment, such as pressure vessels, tanks, or other similar articles. In the present illustration, the invention is shown applied to a pipe P, in which a perforation or fracture F has occurred, which it is desired to repair without interrupting the flow of the fluid under pressure through the pipes.

The repair device of the invention comprises a metal patch 10 adapted to be applied over the perforation or crack F, and which is shaped to conform approximately to the contour of the pipe. The patch may be formed of suitable material, such as cast iron, steel, or the like, and is of generally rounded, concavo-convex contour.

The patch is applied to the pipe with its concave side facing the external surface of the pipe and between the patch and the pipe, seal forming means is provided, which takes the form of an inner pad 12, of resilient material, such as rubber, which is of substantially uniform thickness and located generally centrally of the metal body 10 of the patch, and an outer, generally annular element 14, also formed of similar resilient material positioned in radially spaced relation to the inner element 12 and of substantially the same thickness. The inner and outer seal forming elements 12 and 14 are positioned to form between them an annular chamber surrounding the inner element between the inner face of the metal body 10 and the outer face of the pipe P when the patch is in position on the pipe, and into which chamber a suitable seal forming and adhesive material may be introduced to adhere the patch to the pipe.

The metal body 10 is provided with suitable openings 16 and 18 therethrough, which are located to be in communication with the chamber when the patch is applied and which are internally threaded for the insertion therein of screw plugs, such as the plug 20, by which the chamber will be closed. The metal body 10 is also formed with a bearing cap 22, centrally located thereon for engagement with the end of a screw 24 carried by a clamp, by which the patch is securely held in position on the pipe during application of the patch to the pipe. The clamping device of which the screw 24 forms a part may conveniently take the form of a yoke 26, whose arms are externally threaded, as indicated at 28, and to which a perforated tension bar 30 is applied, the tension bar having openings, such as the opening 32, near its opposite ends, through which the arms 28 are extended, and the arms being provided with nuts 34, threaded thereon by which the tension bar is adjustably held on the yoke. The screw 24 is threaded through a suitable opening located centrally of the tension bar 30 to position the screw for engagement with the bearing cap 22, to apply pressure to the patch to force sealing elements 12 and 14 into tight sealing engagement with the pipe P. The seal forming elements 12 and 14 may be attached to the metal body 10 of the patch in any suitable manner, such as cementing, vulcanizing, or otherwise, to hold the elements in proper position and to assure a fluid-tight seal when the patch is applied.

In making use of the invention, constructed as described above, the patch is placed on the pipe P with the inner sealing element 12 covering the hole or break F in the pipe, and the clamp is applied, and the screw 24 tightened to apply pressure to the seal forming elements 12 and 14 to form a fluid-tight seal between the external surface of the pipe and the inner face of the metal body. With the patch thus positioned over the leak, the inner seal forming element 12 will effectively close the hole or fracture F to prevent the leakage of fluid from the interior of the pipe into the annular chamber 11, to permit the introduction of suitable seal forming and adhesive material into the chamber.

Any desired sealing and adhesive material may be introduced into the chamber 11, such as a settable plastic of any well known type, such as an epoxy ether resin composition, which may be prepared in a liquid form with a suitable catalyst to cause setting or solidification of the material in the chamber to form a fluid-tight seal between the pipe and patch and to firmly adhere the patch to the pipe. The seal forming and adhesive material may conveniently be introduced into the chamber 11 by removing the plugs 20 from the openings 16 and 18 and introducing the material in a liquid or flowable condition into the chamber through a supply pipe 36 to fill the chamber, after which the screw plugs may be reinserted and tightened to apply pressure to the material to force the same into intimate contact with the parts. It will be apparent that because of the sealing off of the leak by the inner pad 12, the leakage of fluid from the pipe into the chamber 11 will be prevented, to prevent the formation of bubbles in the seal forming and adhesive material in the chamber, or other disruption of this material during the setting of the same. Moreover, the seal forming and adhesive material in the chamber 11 will be prevented from escaping outwardly from beneath the body 10 by the outer seal forming element 14, so that when the material has set, the patch will be securely attached to the pipe, and leakage from the pipe will be prevented after the clamp has been removed.

It will thus be seen that the invention, constructed and used as described above, provides a cold patch for repairing leaks in pipes, and the like, while fluid under pressure is flowing therethrough, without the necessity for disconnecting the pipe or shutting off the flow of fluid therethrough.

It will also be apparent that the invention avoids the necessity of welding the patch to the pipe with the attendant danger of damage to the pipe, the occurrence of additional leaks, or the failure of the patch to form a perfect seal.

The invention is disclosed herein in connection with a certain specific embodiment of the same, but it will be understood that this is intended by way of illustration only, and that various changes can be made in the construction and manner of application of the patch within the spirit of the invention and the scope of the appended claims.

Having thus clearly shown and described the invention, what is claimed as new and desired to secure by Letters Patent is:

1. A patch for pipes containing fluid under pressure comprising a body having a concave face shaped to conform to the curvature of the external surface of a pipe, an inner pad of resilient material on the face of the body in position for sealing engagement with the pipe about an opening in the wall of the pipe to close the opening, an outer pad of resilient material on said face in position for sealing engagement with the pipe to form with the pipe, body and inner pad a chamber surrounding the inner pad, said body having spaced apart openings in communication with said chamber and opening to the exterior of the body and through one of which a sealing material may be introduced into said chamber while allowing an outflow of gas from the chamber through the other of said openings to completely fill the chamber with the sealing material.

2. A patch for pipes containing fluid under pressure comprising a body having a concave face shaped to conform to the curvature of the external surface of a pipe, an inner pad of resilient material on the face of the body in position for sealing engagement with the pipe about an opening in the wall of the pipe to close the opening, an outer pad of resilient material on said face in position for sealing engagement with the pipe to form with the pipe, body and inner pad a chamber surrounding the inner pad, said body having spaced apart openings in communication with said chamber and opening to the exterior of the body and through one of which a sealing material may be introduced into said chamber while allowing the escape of gas from the chamber through the other of said openings to completely fill the chamber with the sealing material and means removably insertable in said openings into contact with said sealing material to apply a compressive force to the sealing material.

References Cited in the file of this patent
UNITED STATES PATENTS
2,850,045    Soehnlen et al. _____ Sept. 2, 1958